L. A. PETERSON.
COUPLING FOR AIR BRAKE PIPES.
APPLICATION FILED JUNE 29, 1909.
957,087.
Patented May 3, 1910.
2 SHEETS—SHEET 1.
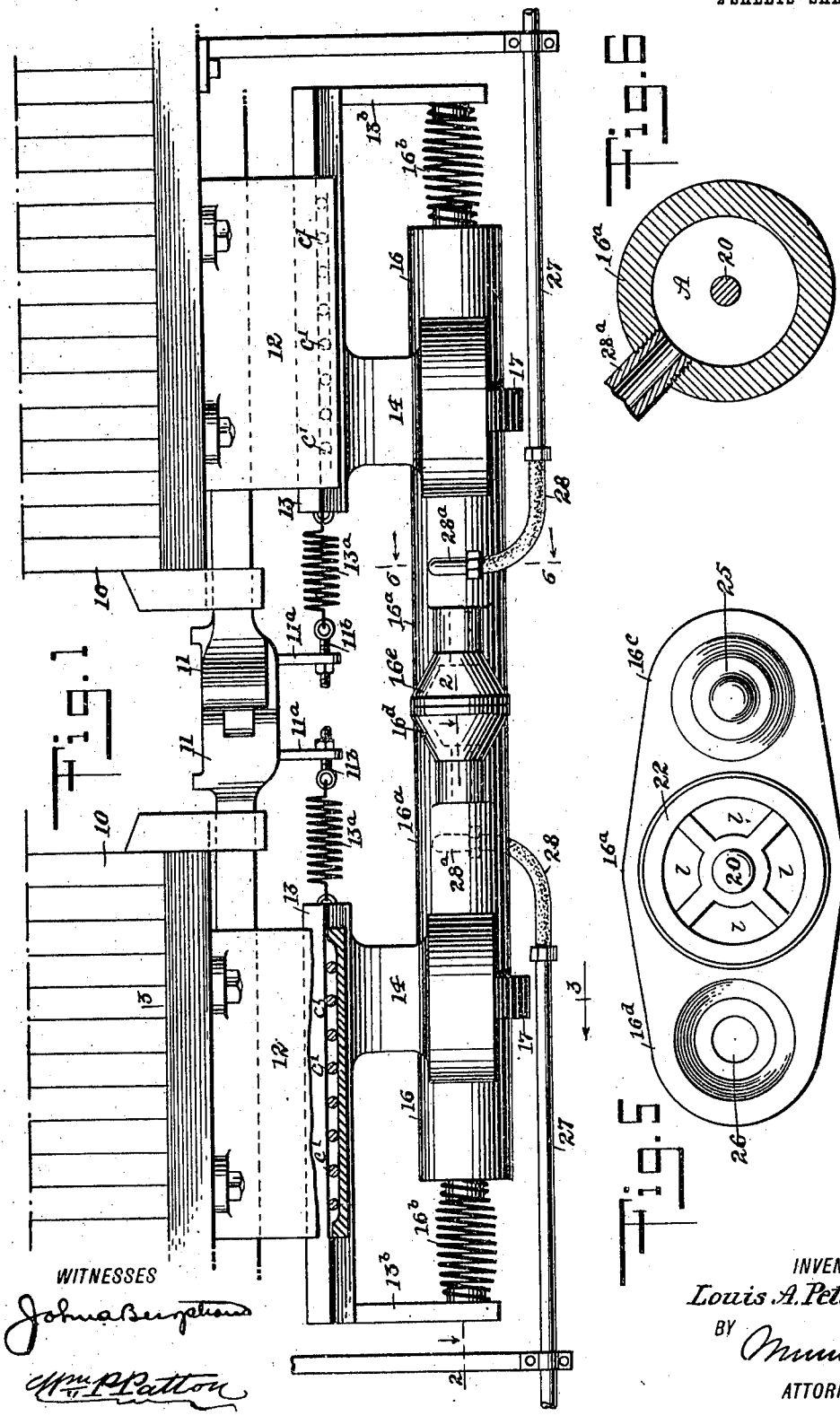
WITNESSES
INVENTOR
Louis A. Peterson
BY
ATTORNEYS

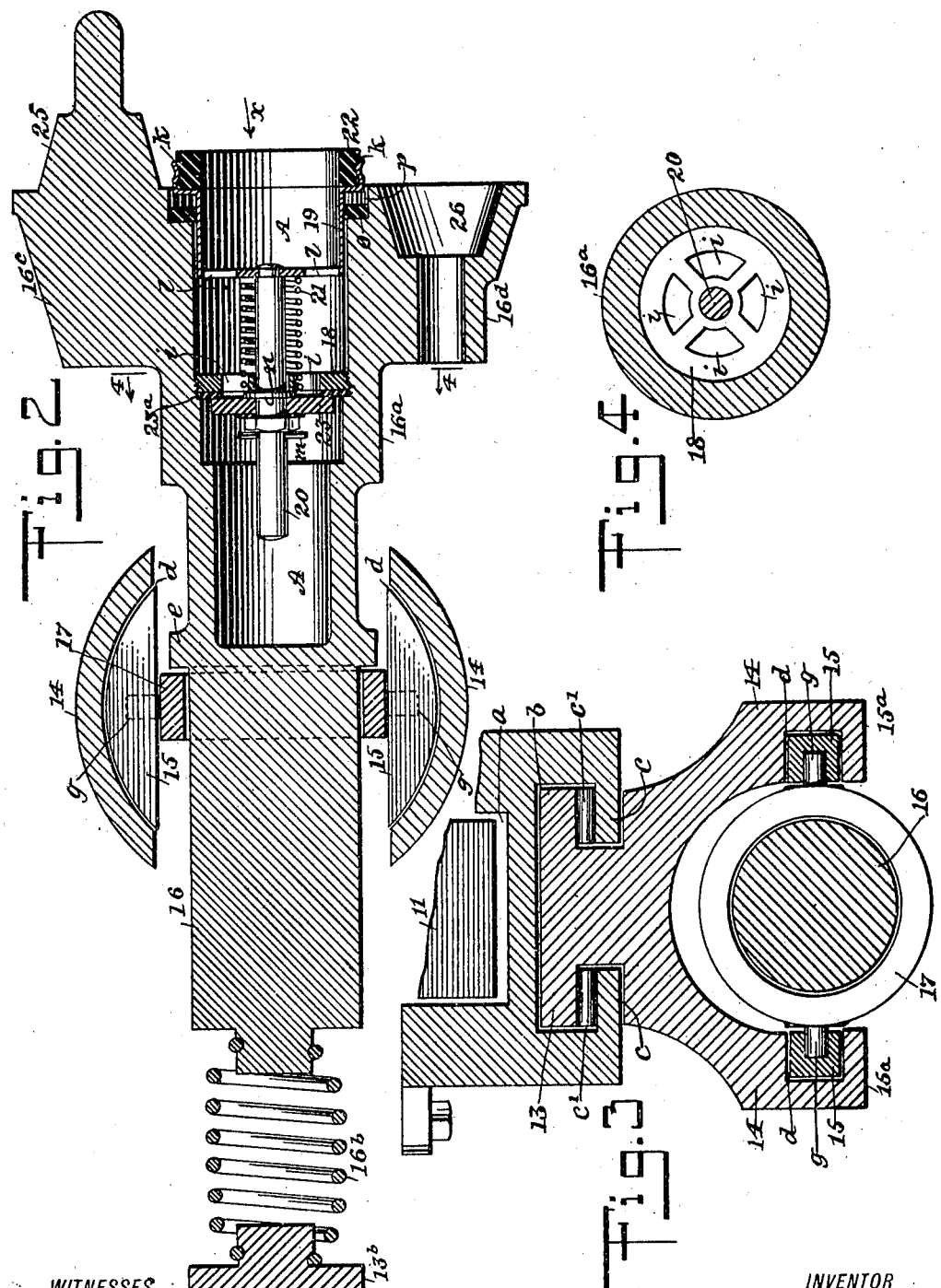

UNITED STATES PATENT OFFICE.

LOUIS A. PETERSON, OF HANNAFORD, NORTH DAKOTA.

COUPLING FOR AIR-BRAKE PIPES.

957,087.    Specification of Letters Patent.    Patented May 3, 1910.

Application filed June 29, 1909. Serial No. 504,978.

*To all whom it may concern:*

Be it known that I, LOUIS A. PETERSON, a citizen of the United States, and a resident of Hannaford, in the county of Griggs and State of North Dakota, have invented a new and Improved Coupling for Air-Brake Pipes, of which the following is a full, clear, and exact description.

This invention relates to means for reliably coupling together the sections of an air-brake supply pipe, that extend from car to car throughout a train, and particularly to such appliances as are provided for conveying air under pressure to the air-actuated brakes of a train of freight cars.

The purpose of the invention is to provide novel details of construction for air-brake pipe couplings, that coöperate with the car couplings for a train of cars, and simultaneously couple their members together when car couplings on cars having the improvements, are coupled together by an endwise movement of said cars that occupy the same railroad track.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a side view in part of two cars coupled together, and of the improved air-brake pipe coupling, slidably hung from the bottom frames of said cars; Fig. 2 is an enlarged sectional plan view of the improved air-pipe coupling on one car, substantially on the broken line 2—2 in Fig. 1; Fig. 3 is an enlarged transverse sectional view of novel details, substantially on the line 3—3 in Fig. 1; Fig. 4 is a transverse sectional view of the parts, substantially on the line 4—4 in Fig. 2; Fig. 5 is an enlarged end view of the air-brake pipe coupling on a car, seen in the direction of the arrow *x* in Fig. 2; and Fig. 6 is an enlarged transverse sectional view of details, substantially on the line 6—6 in Fig. 1.

In the drawings, 10, 10, represent the lower portions and adjacent ends of two freight cars, shown to illustrate the application of the improved air-brake pipe coupling, and 11, 11, indicate two car couplings that may be of the Janney type, said couplings being locked together, as appears in Fig. 1.

Centrally on the bottom of each car 10 and near the ends thereof, two similar guide boxes 12, 12, are secured, that are recessed in their upper sides; these ractangular recesses *a* each extending throughout the length of each box at its transverse center, and respectively receive the body of one of the car couplings 11 that are thus supported in operative position on corresponding car bodies.

In each guide box 12, below the recess *a*, a longitudinal T-shaped channel *b* is formed, leaving two guide flanges *c*, *c*, which remain intact with the body of said guide box, and as shown in Fig. 3, said guide flanges are level with each other on their upper surfaces. A hanger bracket is provided for each guide box 12, and as appears in Figs. 1 and 3, these similar brackets are each formed with an elongated slide block 13 that is fitted loosely in the T-shaped channel *b* within a respective guide box, so that the slide block may receive longitudinal adjustment thereon. Preferably, as a means for reducing friction between the flanges *c*, *c*, and each slide block 13, a plurality of similar rollers *c'* are transversely disposed therebetween, which will greatly facilitate the longitudinal movement of the slide block. From each slide block 13, two spaced arms 14 project downwardly said arms having rectangular open recesses *d* that have curved back walls that are segments of the same circle. In the concaved recesses *d* in each pair of depending arms 14, two similar rocker blocks 15 are loosely secured by means of keeper flanges 15ª, that are formed integral with the lower ends of the arms 14, as indicated in Fig. 3.

An air brake pipe coupling is provided for each car coupling 11, and as said pipe couplings are of similar construction, a description of one of said pipe couplings will serve for both.

As represented in Figs. 1 and 2, the body 16 of the air-brake pipe coupling is in the form of an elongated metal block, having a preferably cylindrical rear portion that is solid, and terminates at its forward end in a circumferential collar *e*. On the body portion 16, a trunnion ring 17 is slidably fitted, and diametrically opposite each other two trunnions *g* are formed or secured on the outer side of said ring.

In the straight inner surface of the rocker blocks 15, opposite sockets are formed, which respectively receive one of the trunnions $g$, whereby the ring 17 and rocker blocks 15 when in position on the depending arms 14, are adapted for supporting the body of the air brake pipe coupling free to receive rockable and rotatable adjustment.

From the collar $e$, the body of the air brake pipe coupling is extended of a proper length for effective service, and in said portion $16^a$, an axial chamber A is formed, that is extended from the front end thereof rearwardly a proper distance. In the cylindrical bore of the chamber A, near its center of length, a valve seat block 18 is secured removably, said block having parallel sides and a circular periphery that is threaded and engages a corresponding thread cut in the defining side wall of the chamber A.

The valve seat block 18, as shown best in Fig. 4, is provided with a plurality of spaced openings $i$ and a central circular aperture that is surrounded by said openings. A preferably cylindrical hollow plunger head 19 is slidably fitted in the true bore of the chamber A, and occupies the portion of said bore that is forward of the valve seat block 18. Centrally in the head wall of the plunger 19, one end of a rod 20 is secured, that has sufficient length to pass through the central aperture in the valve seat block 18 and reciprocate therein. A plurality of openings $l$ are formed in the head wall of the plunger 19, near its edge. Upon the rod 20, between the plunger head 19 and valve seat block 18, a coiled spring 21 is mounted and has contact therewith, the length of the spring being such that the plunger head is normally disposed with its front end near the open front end of the chamber A, but is extended therefrom for the reception of a packing ring 22 that is secured thereon and normally projects somewhat in advance of the body $16^a$. A disk valve 23, of suitable material, is mounted upon the rod 20, rearward of the valve seat block 18, and is secured in proper position by a thin collar $n$ that is fixed on the rod, and a nut on the opposite side of the valve, said nut being held from retraction by a cross pin $m$ as shown in Fig. 2. Preferably a packing ring $23^a$ is introduced between the valve 23 and the valve seat block 18, as shown in Fig. 2.

It will be noted in Fig. 2, that the front end portion of the plunger head 19 is diametrically enlarged, sufficiently to provide an annular recess $k$, wherein the packing ring 22 is seated and secured, said enlarged end portion of the plunger head fitting loosely in a circumferential recess $p$ that is formed in the front end of the wall that defines the bore or chamber A. A packing ring $o$ is seated in the recess $p$, as shown in Fig. 2.

It will further be seen that the rearward movement of the plunger head 19, due to pressure on the front of the packing ring 22, will be limited by the impingment of the offset shoulder that forms the bottom wall of the recess $k$ upon the bottom wall of the recess $p$ and cushion ring $o$, thus defining the travel of the rod 20 rearward, and the rearward movement of the disk valve 23 from the valve seat block 18, which produces a continuous open passage from the rear portion of the chamber A forwardly through the openings $i$ and $l$ and out of the forward end of said chamber, as is hereinafter more fully explained.

An arm $11^a$ extends down from each car coupling draw-head 11, and at the lower end is adjustably connected by an eye bolt $11^b$ with the forward end of a heavy coiled spring $13^a$ that is secured at its rear end upon the front end of a respective slide block 13, as is clearly shown in Fig. 1.

Upon the rear end of the body 16 for each air brake coupling, one end of a strong coiled spring $16^b$ is attached and extends rearward, and upon a corresponding slide block 13, at the rear end thereof, the upper end of a vertical arm $13^b$ is affixed. The arm $13^b$ on each slide block 13, is secured at the lower end thereof upon the rear end of an adjacent coiled spring $16^b$, and it will be seen that the opposed tension of the springs $13^a$ and $16^b$ will normally dispose the body 16, $16^a$, of a respective air brake pipe coupling on a car body 10, in a suitable position for engagement with a similar pipe coupling on another car body 10, that becomes coupled by the car couplings 11 with the one first mentioned.

As shown in Figs. 2 and 5, the front end of the body for the improved air brake pipe coupling is laterally enlarged, affording two lugs $16^c$, $16^d$, that are disposed oppositely and horizontally thereon, one lug $16^c$ having a guide arm 25 forwardly extended therefrom, and in the other lug $16^d$, a recess 26 is formed of a shape and dimensions that adapt it to loosely receive an arm similar to the arm 25, which may project forwardly from a similar air brake pipe coupling on another car 10 that approaches the one first mentioned.

Assuming that the freight cars of a railroad, whereon the improved apparatus is to be placed, are provided with the usual air-holding tanks and means for storing air under pressure therein, there is an air-conducting pipe 27 provided for connecting the storage tank (not shown) on each car, for the transfer of air under pressure from the air-condensing means on a locomotive engine to all the air receivers on a connected train of cars. To this end, the pipes 27, shown in Fig. 1, are respectively extended from the air storage tank on each car to the air pipe coupling bodies 16 at each end of each car.

To permit proper end play in the air brake pipe coupling bodies 16, the adjacent end of a respective pipe 27 is furnished with a short section of pliable hose 28, which is attached at one end upon the end of the pipe 27, and at its opposite end is joined to an angular metal pipe fitting 28ª that screws into a tapped perforation in the body 16ª, as is indicated in Figs. 1 and 6.

It will be noted that the air-conducting pipe 27 for each air brake pipe coupling is attached to the coupling body 16ª thereof, at a point rearward of the disk valve 23; hence when air pressure is transferred through a pipe 27 into the hollow body 16ª, the valve 23 will be pressed upon the valve seat block 18 and the connected end of the air-conducting pipe will be practically sealed, so that there will be no loss of air pressure if a car is detached from a train or from a locomotive engine.

In service it will be seen that when two cars having the improvement, are caused to approach each other on the same track, the act of effecting their coupled connection by means of the car couplings 11, will dispose the front ends of the air brake pipe coupling bodies 16, 16ª, opposite each other, and the guide arms 25 will enter the recesses 26, which will cause the packing joint rings 22 to impinge upon each other; and when the car couplings 11 are connected together, there will be an air-tight junction effected between the meeting ends of the air brake pipe connections, and a continuous supply pipe for air under pressure will extend from end to end of a train of cars having the improved air pipe couplings.

As hereinbefore explained, the connection of the slide bars 13 with the guide boxes 12 and their support on rollers c' permits the springs 13ª, 16ᵇ, to freely adjust the bodies of two air brake pipe couplings 16, 16ª longitudinally and to press the packing rings 22 forcibly together. Further, as the manner of connecting the bodies 16, 16ª, with the pendent arms 14, permits them to receive rotatable, as well as rockable adjustment from a horizontal plane, it will be obvious that there will be a universal joint connection afforded between each pair of air pipe couplings, which will yield in all directions, so as to permit the free traverse of a train of cars on a curve or on grades, without cramping at their jointed connection or causing leakage thereat. It will also be apparent that the improved air brake pipe connections for two cars or a train, will couple together indiscriminately and in an automatic manner. As there are no positive attachments employed between two couplings of the improved construction, it will be noted that the act of detaching coupled cars, will instantly release the sections of the air brake pipe couplings that are controlled by the car couplings.

Having thus described my invention, I claim as new and desire to secure by Letters Patent:

1. A pipe coupling embodying a hollow body, a support having a guideway, a slide mounted to reciprocate in said guideway, the said slide having spaced depending members, a universal joint connection between the body and said members of the slide, and means for establishing an air-tight detachable connection between the meeting ends of two of said bodies.

2. A pipe coupling, embodying a hollow body, a guide box supported on the bottom of a car, a slide reciprocal in the guide box and having depending arms, a universal joint connection between the hollow body and the said depending arms of the slide, an air supply for the body, and means for establishing an air-tight detachable connection between the meeting ends of two of said bodies.

3. A pipe coupling, comprising a slide having downwardly projecting members, a hollow body, open at one end and carried by said members of the slide, a pipe supplying air under pressure to said body, a valve normally closing the open end, and means for opening said valve when two of said bodies are coupled together at their open ends.

4. A pipe coupling, comprising a guide box supported on the bottom of a car, a slide mounted to reciprocate longitudinally in the guide box and having downwardly projecting spaced arms, a hollow coupling body, a universal joint connection between the coupling body and the said arms, a sealing valve in the coupling body which is opened by the impact of a similar coupling body, and means for supplying air under pressure within the body of the coupling and that is controlled by the valve.

5. In combination, a car, a car coupling thereon, an air brake pipe coupling, a bar slidable on the car and carrying the pipe coupling, a spring connecting one end of the pipe coupling with the slidable bar, and a spring connecting the forward end of said bar with the car coupling.

6. In combination, a car, a car coupling on one end of the car, a slide bar reciprocal on a support pendent from the car, an arm depending from the car coupling, a coiled spring connected by one end with the depending arm and at the other end with the forward end of the slide bar, an arm pendent from the rear end of the slide bar, and a coiled spring connected at its ends with the rear end of the pipe coupling and with the lower end of the pendent arm.

7. An air brake pipe coupling, embodying a guide box hung from a car, a slide bar reciprocal in the guide box, rollers between the guide box and slide bar, spaced arms depending from the slide bar, an air brake pipe coupling body, and a universal joint connection between the coupling body and the arms.

8. An air brake pipe coupling, embodying a guide box hung from a car and having a T-shaped recess longitudinal therein, a slide bar reciprocal in said recess, rollers between the guide box and slide bar, two spaced arms pendent from the slide bar, said arms having concave-bottomed recesses oppositely therein, rocker blocks seated in said recesses, a trunnion ring having opposite trunnions thereon, said trunnions occupying sockets in the rocker blocks, and a hollow body for an air brake coupling, carried by the trunnion ring.

9. In an apparatus of the character described, the combination with a car, a car coupling thereon, and a guide box recessed longitudinally and receiving therein the draw bar of the car coupling, said guide box also having a T-shaped recess therein below the one occupied by the car coupling, of a slide bar reciprocal in the T-shaped recess, rollers between the guide box and slide bar, two spaced arms pendent from the slide bar, said arms near their lower ends having opposite concave bottomed recesses therein, like rocker blocks seated in the recesses and adapted for rocking adjustment therein, said blocks having opposite sockets, a trunnion ring having opposite trunnions thereon that occupy the sockets, and a hollow body for an air brake pipe coupling occupying the trunnion ring.

10. An air brake pipe coupling, embodying an elongated body hung from a car, said body having a cylindrically bored chamber therein open at the front end, a plunger head having openings in its end wall and slidable in the forward portion of said chamber, a rod extended rearward and centrally from the plunger head, an apertured valve seat block fixed in the chamber behind the plunger head and through which the rod slides, a disk valve fixed on the rod rearward of the valve seat block, and a packing joint ring secured on the open front end of the plunger head.

11. An air brake pipe coupling, embodying an elongated hollow body open at the front end and hung from a car so as to yield laterally rearwardly and vertically, a valve seat in said body, a plunger head slidable therein, a rod on said head slidable through the valve seat, a disk valve on the rod that contacts with the rear side of the valve seat, a packing joint ring on the front end of the plunger head, and an air supply pipe yieldingly connected with the coupling body rearward of the valve seat.

12. An air brake pipe coupling, embodying an elongated hollow body, open at the front end and hung from a car so as to yield vertically, laterally and rearwardly, a valve-seat in said body, a plunger-head forward of the valve-seat and having a radial flange on its front end, the body having an annular recess at the front end, wherein said flange is located, an annular pliable joint between the rear wall of the annular recess and the rear side of the radial flange, a pliable joint ring in the recess at the front of the radial flange, a rod centrally extended rearward from the plunger-head and passing loosely through the valve-seat, a disk-valve secured on the rod, rearward of the valve seat, a packing joint between the valve and the valve-seat, and an air supply pipe yieldingly connected with the coupling body, rearward of the valve-seat therein.

13. A pipe coupling comprising a guide supported from a car, a longitudinally reciprocable slide in said guide, spaced arms depending from the slide and having oppositely arranged recesses having curved back walls, rocker blocks having curved outer faces and seated in said recesses, a trunnion ring having trunnions mounted to turn in sockets formed in the inner faces of said rocker blocks, and a pipe coupling body carried by said trunnion ring.

14. An air brake pipe coupling apparatus comprising a hollow coupling body open at one end, means for producing an air tight yielding connection between the open end and a like end on another similar coupling body, a member mounted to reciprocate longitudinally beneath a car and having a depending arm at its rear end, a connection between the coupling body and the said member to permit the coupling body to reciprocate with the said member, the said connection also permitting a lateral turning adjustment of the coupling body and a rocking adjustment of said coupling body in a vertical plane, a coiled spring supported at one end and connected at the other end with the forward end of said member, and a coiled spring connected at one end with the arm on the rear end of said member and at its other end with the rear end of said coupling body, the said springs cushioning the longitudinal sliding movement of said coupling body and said member in each direction.

In testimony whereof I have signed my name to this specification in the presence of two subscribing witnesses.

LOUIS A. PETERSON.

Witnesses:
O. E. THORESON,
LEIGH J. MONSON.